(12) United States Patent
Fin

(10) Patent No.: US 12,408,791 B2
(45) Date of Patent: Sep. 9, 2025

(54) BREWING DEVICE FOR PRODUCING A BEVERAGE FROM A SINGLE-SERVE CAPSULE

(71) Applicant: SAGA COFFEE S.P.A., Valbrembo (IT)

(72) Inventor: Giuseppe Fin, Valbrembo (IT)

(73) Assignee: SAGA COFFEE S.P.A., Gaggio Montano (IT)

( * ) Notice: Subject to any disclaimer, the term of this patent is extended or adjusted under 35 U.S.C. 154(b) by 787 days.

(21) Appl. No.: 17/440,036

(22) PCT Filed: Mar. 20, 2020

(86) PCT No.: PCT/IB2020/052633
§ 371 (c)(1),
(2) Date: Sep. 16, 2021

(87) PCT Pub. No.: WO2020/194156
PCT Pub. Date: Oct. 1, 2020

(65) Prior Publication Data
US 2022/0175178 A1    Jun. 9, 2022

(30) Foreign Application Priority Data

Mar. 22, 2019 (EP) ................................ 19164740
Jul. 31, 2019 (IT) .................... 102019000013443

(51) Int. Cl.
*A47J 31/36* (2006.01)
(52) U.S. Cl.
CPC ....... *A47J 31/3633* (2013.01); *A47J 31/3628* (2013.01); *A47J 31/3676* (2013.01); *A47J 31/368* (2013.01)
(58) Field of Classification Search
CPC ................ A47J 31/3642; A47J 31/3633; A47J 31/3638; A47J 31/3676; A47J 31/368
See application file for complete search history.

(56) References Cited

U.S. PATENT DOCUMENTS 9,974,410 B2 * 5/2018 Ferrier ................ A47J 31/3638
2009/0199518 A1 8/2009 Deuber et al.
(Continued)

FOREIGN PATENT DOCUMENTS

CH          697407 B1    9/2008
CN       101528099 A    9/2009
(Continued)

OTHER PUBLICATIONS

International Preliminary Report on Patentability for International Application No. PCT/IB2020/052633 mailed Mar. 16, 2021.
(Continued)

*Primary Examiner* — Reginald Alexander
(74) *Attorney, Agent, or Firm* — Ballard Spahr LLP

(57) ABSTRACT

A brewing device for producing a beverage from a single-serve pod of the type comprising a casing formed of two sheets to form a central body containing a brewable material, and an external annular flange that extends all around, and seals, the central body; the brewing device comprises a water injection assembly and a beverage extraction assembly defining respective half-chambers and mutually movable along a longitudinal axis, from and to a closed configuration forming a brewing chamber for the pod; and a pod support device rotatably mounted about a fixed axis transverse to the longitudinal axis to move between a retention position, supporting a pod in a loading position between the injection assembly and extraction assembly, and a disengagement position, and it is configured to insert and leave the pod in the brewing half-chamber of the extraction assembly before reaching the disengagement position.

11 Claims, 12 Drawing Sheets

(56) References Cited

U.S. PATENT DOCUMENTS

| | | | |
|---|---|---|---|
| 2013/0068110 A1 | 3/2013 | Pagano et al. | |
| 2014/0150616 A1 | 6/2014 | Zanetti et al. | |
| 2015/0050404 A1* | 2/2015 | Ferrier | A47J 31/3633 99/295 |
| 2015/0272379 A1 | 10/2015 | Perentes et al. | |
| 2015/0297019 A1* | 10/2015 | Ferrier | A47J 31/3633 99/295 |

FOREIGN PATENT DOCUMENTS

| | | | |
|---|---|---|---|
| CN | 101610703 A | 12/2009 | |
| CN | 103153143 A | 6/2013 | |
| CN | 104812277 A | 7/2015 | |
| CN | 106264143 A | 1/2017 | |
| CN | 107223031 A | 9/2017 | |
| CN | 108289563 A | 7/2018 | |
| CN | 108882804 A | 11/2018 | |
| EP | 1859714 B2 | 5/2015 | |
| FR | 2723524 A1 * | 2/1996 | A47J 31/3623 |
| FR | 2998463 A1 | 5/2014 | |
| RU | 2607773 C2 | 1/2017 | |
| WO | 2010066736 A1 | 6/2010 | |
| WO | 2010103044 A1 | 9/2010 | |
| WO | 2012046195 A1 | 4/2012 | |
| WO | 2014056716 A1 | 4/2014 | |
| WO | 2017108759 A1 | 6/2017 | |

OTHER PUBLICATIONS

International Search Report and Written Opinion from International Application No. PCT/IB2020/052633 mailed Jun. 19, 2020.
Office Action for Russian Application No. 2023134061/03(075015) mailed May 31, 2024.
Search Report for Russian Application No. 2023134061/03(075015) May 17, 2024.
Office Action for Chinese Application No. 202310809853.9 mailed Jul. 1, 2025.
Office Action for Chinese Application No. 202310807629.6 mailed Jun. 27, 2025.

* cited by examiner

BREWING DEVICE FOR PRODUCING A BEVERAGE FROM A SINGLE-SERVE CAPSULE

CROSS-REFERENCE TO RELATED APPLICATIONS

This patent application is a U.S. National Stage of PCT International Application No. PCT/IB2020/052633 filed on 20 Mar. 2020, which claims priority from Italian patent application No. 102019000013443 filed on 31 Jul. 2019 and from European Patent Application No. 19164740.3 filed on 22 Mar. 2019, the entire disclosure of each of which is incorporated herein by reference.

TECHNICAL FIELD OF THE INVENTION

The present invention relates to a brewing device for producing a beverage from a single-serve capsule containing brewable material.

In particular, the present invention can advantageously be applied in the use of capsules of the type consisting of two sheets that are mutually coupled around a certain amount of a brewable material, for example ground and pressed coffee, so as to define a casing consisting of a rounded central portion, which contains the brewable material, and a flat circular flange which surrounds and seals the central portion.

STATE OF THE ART

This type of capsules, also known as pods or pads, which the present disclosure makes specific reference without excluding general reference, are commonly made by coupling, conveniently by heat-sealing, two filter paper sheets or two aluminium sheets, or of a multilayer material containing at least an aluminium layer.

In the latter case, i.e., in case of pods with an aluminium casing, the stiffness associated to the material of the casing provides the capsule with a so called self-standing structure, meaning that the body of the pod and, specifically, the flange of the pod, is so stiff as to cause the pod to be able to stand loads of a certain extent, far higher than those of filter paper capsules, without flexing or deforming.

In particular, thanks to the intrinsic strength of the aluminium and to the fact that the radial width of the flange is generally far smaller than the diameter of the pod central portion, it is known that the flange of an aluminium pod is stiff enough to fail to deform when the pod is placed in an upright position, standing on the flange.

Due to the fact that aluminium acts as a barrier to oxygen and other external agents, such as humidity and powder, from which the brewable material must be protected to avoid aroma and taste deterioration, this type of capsules has in itself the advantage of being sealed and does not require to be stored in a protected atmosphere, for example inside a sealed external casing.

By contrast, these sealed capsules need, in use, to be pierced to create passages in the aluminium casing to allow injected hot pressured water to enter through a face of the pod, and the beverage to outflow from the opposite face. It is therefore necessary to provide the brewing device with suitable piercing devices, which inevitably increase the mechanical and functional complexity of the brewing device.

As known, there are different types of brewing devices on the market that are designed to receive single-serve pods as the ones described above.

One of these types consists of horizontally-structured brewing devices, i.e. brewing devices composed of two parts that are mounted to mutually move along a horizontal axis between a spaced apart configuration, and a coupling configuration, in which the two parts are pressed one against the other and define therebetween a brewing chamber adapted to contain a previously loaded pod.

If compared to other types of brewing devices, the horizontally-structured ones have several advantages, among which, in particular, the possibility to take advantage of the force of gravity to load by gravity a new pod between the two parts of the brewing device and, above all, to discharge by gravity the exhausted pod from the brewing chamber once the beverage dispensing process is over, after the two parts of the brewing device have returned in the mentioned spaced-out configuration.

As known in the field of coffee machines, horizontal-structured brewing devices are preferred more frequently when they are intended to be used with capsules other than pods, namely with cup-shaped pods consisting of a relatively stiff cup-shaped body closed by a film of pierceable material, usually aluminium. In these cases, the cup shape and the relative stiffness and strength of the capsule enable a relatively easy handling inside the brewing device, substantially without risks that the capsule undergoes deformations that would hinder the functionality thereof.

An example of this use is offered by the brewing device disclosed in the Application WO 2017/108759 A1.

By contrast, as regards pods, handling a pod inside the brewing device is more complicated because the pod, having a structure that is less strong than that of a cup-shaped capsule, due either to the material and to the of shape its casing, can easily undergo deformations that may jeopardize the beverage extraction process, as well as the discharge of the exhausted pod.

In an attempt to overcome these problems, the known pod brewing devices are usually provided with specific technical expedients for retaining and handling the pod. However, in practise, the Applicant has experienced that the solutions known so far, not only introduce a remarkable structural complexity in the brewing device, with the detriment of the ease, reliability and cost-effectiveness of the brewing device, but also do not efficiently solve the problem of preventing the pod from undergoing stresses that may result in a permanent deformation thereof.

In EP 1 859 714 B2 a horizontally-structured brewing device for pods is disclosed, which comprises a capsule retention element adapted to receive the capsule when it is loaded and to support it in an intermediate position between the two parts, one of which is fixed and the other one is movable. The retention device forms an end portion of the movable part facing the fixed part and comprises due compartments, the first one of which is closed at the bottom and is occupied by the capsule, when loaded, and the second one is open at the bottom and is occupied by the capsule when the retention device interacts with the fixed part following the advancement of the movable part. When the movable part moves away from the fixed part, along with the retention device, the capsule, which at this time occupies the second compartment, is no longer retained at the bottom and falls downwards. The passage from the first compartment to the second compartment occurs by thrusting the capsule in a direction perpendicular to the flange laying-plane so as to determine a deformation of the flange. In this step, therefore, the capsule is submitted to relatively high stresses which, in some cases, may lead to undesired permanent deformations of the capsule with the resulting risk of jeopardizing the subsequent suitable development of the beverage production step.

OBJECT AND SUMMARY OF THE INVENTION

It is an object of the present invention to improve the brewing device disclosed in WO 2017/108759 A1 so that it can also be used with pods of the above specified type, i.e., pods having a central body and an annular flange.

According to the present invention a brewing device is provided, as claimed in the appended claims.

BRIEF DESCRIPTION OF THE DRAWINGS

The invention will now be described with reference to the enclosed drawings, which show a non-limiting embodiment thereof, wherein.

DETAILED DESCRIPTION OF PREFERRED EMBODIMENTS OF THE INVENTION

The present invention will now be described in detail referring to the enclosed Figures to allow a person skilled in the art to implement it and use it. Various changes to the described embodiments will be immediately apparent to the skilled person and the general principles described may be applied to other embodiments and applications without departing from the protection scope of the present invention, as defined in the enclosed claims. Therefore the present invention is not to be intended as limited to the described and illustrated embodiments, but it must be granted the widest protection scope in compliance with the principles and the characteristics herein described and claimed.

Figure 1:
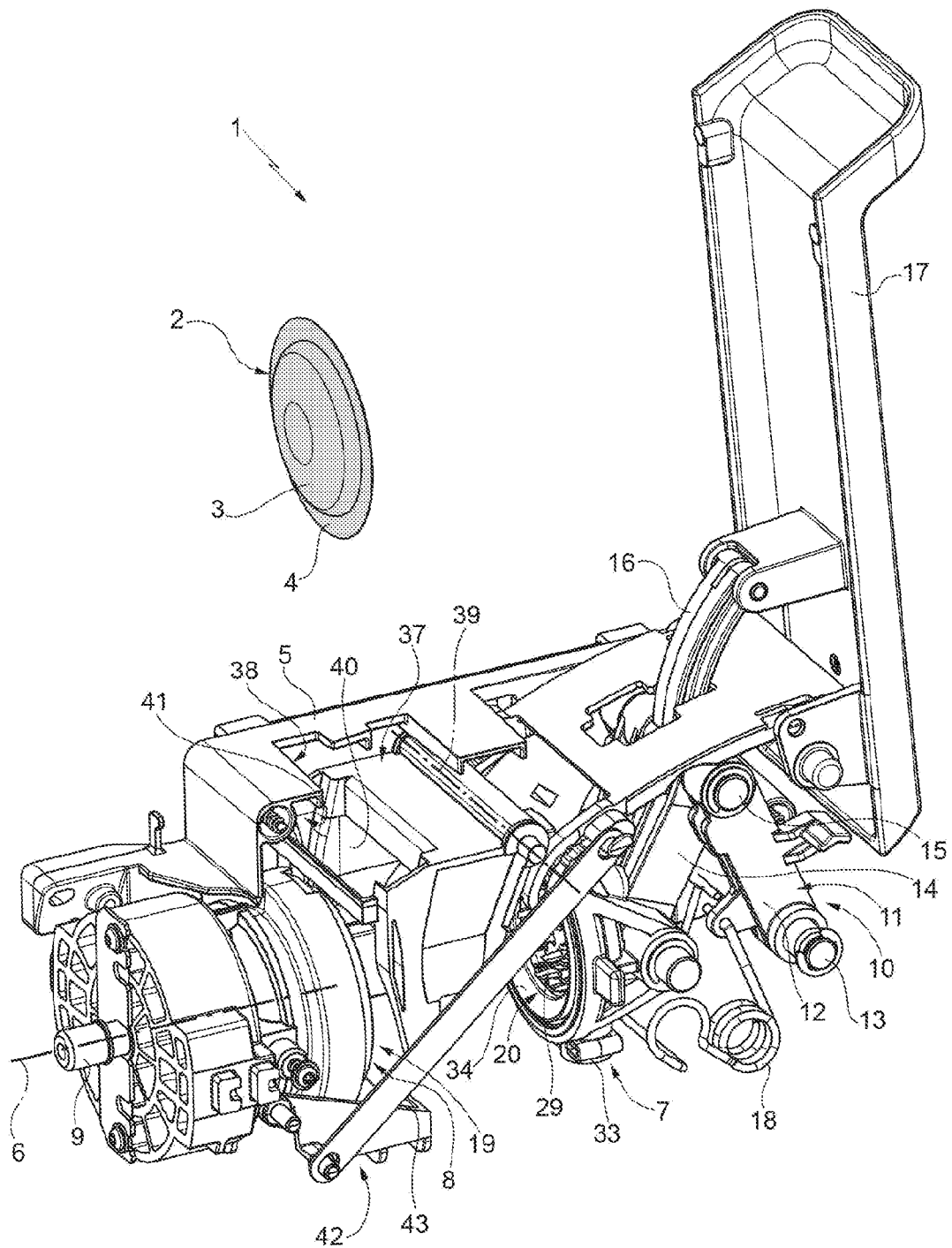
FIG. 1 shows a perspective view, with parts removed for clarity, of a preferred embodiment of the brewing device for producing a beverage of the present invention.

In FIG. 1, a brewing device for producing a beverage from a single-serve pod 2 containing a brewable material such as, for example, ground coffee, is overall indicated by 1.

The pod 2 is a known type of pod comprising a casing formed of two sheets of plastic and/or aluminium or paper mutually coupled to form a compact central body 3 containing a certain amount of a brewable material, for example ground coffee, and having a generally lenticular shape, and an outer annular flange 4 that extends around, and seals, the central body 3.

Preferably, the pod 2 has a shape that is symmetrical with respect to a central plane containing the flange 4 and with respect to an axis 2A perpendicular to said central plane and passing through the centre of the central body 3. Preferably, furthermore, the central body 3 and the flange 4 have a circular shape.

The brewing device 1 is structured to carry out an automatic brewing process, known in itself, namely a brewing process which provides injecting hot pressured water from a side of the pod 2, which was previously fluid-tightly closed inside a brewing chamber, and extracting the beverage from the opposite side the pod 2.

The brewing device 1 is configured to be connected to a source of hot pressured water and can be integrated in a machine for producing beverages intended for home and office use, as in the case of the example described in the present specification and illustrated in the appended claims, or it can be assembled inside a beverage vending machine.

Figure 2:
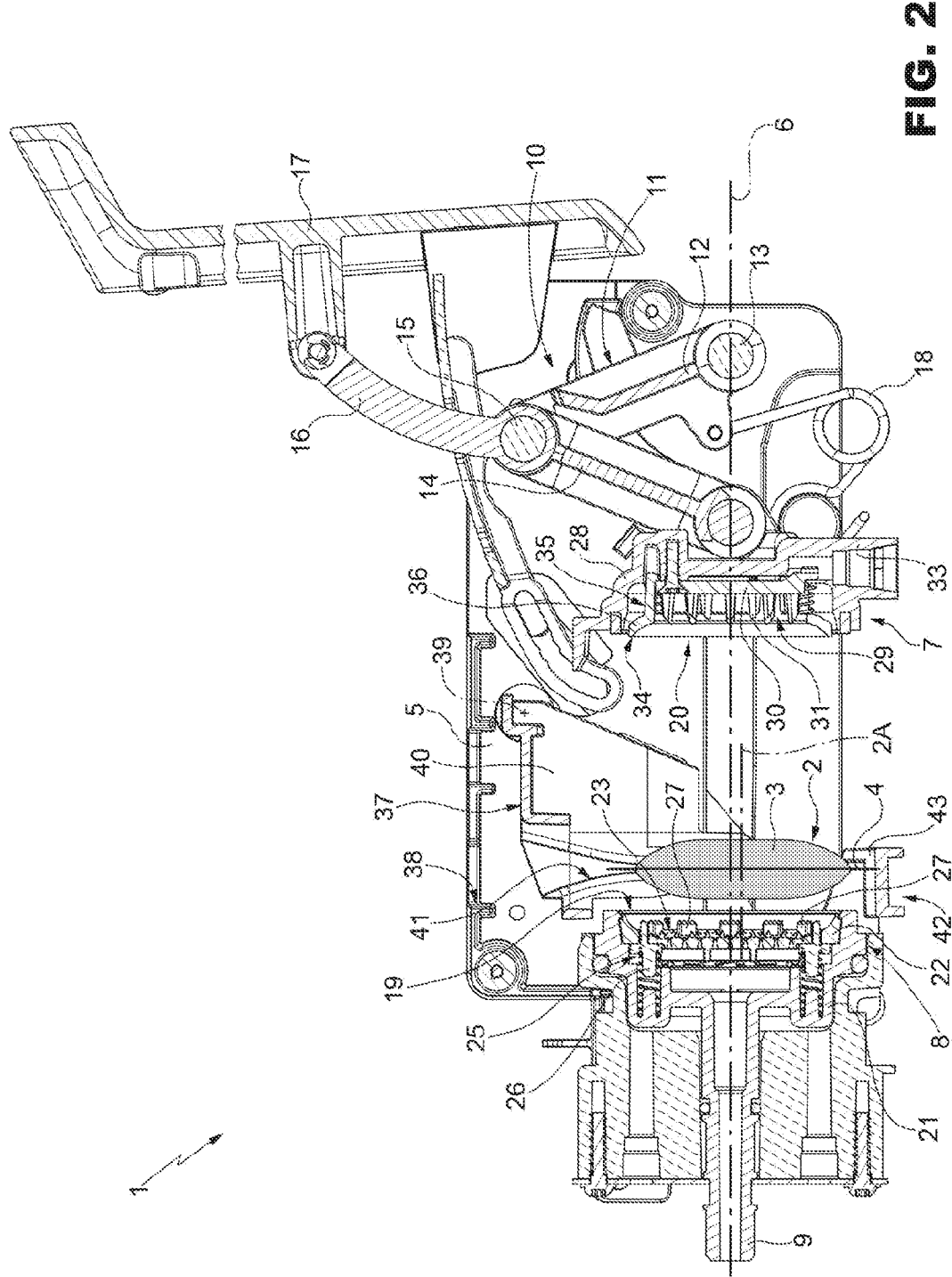
FIG. 2 is a longitudinal section of the brewing device of FIG. 1 disposed in an open configuration, in which a capsule may be loaded.

According to what illustrated in FIGS. 1 and 2, the brewing device 1 comprises a frame 5 composed of two half-shells (only one of which is illustrated) removably assembled between each other. The brewing device 1 further comprises two functional assemblies, which are supported by the frame 5, are each other opposite and aligned along a substantially horizontal axis 6, and are mutually movable to make the brewing device 1 assume an open configuration (FIG. 1), wherein the two functional assemblies are spaced out such to define a gap between them for loading a pod 2, and a closed configuration (FIG. 8), wherein the two functional assemblies are coupled and define the aforesaid brewing chamber.

The two functional assemblies comprise an injection assembly 7 having the function of supplying hot pressured water to the pod 2 enclosed in the brewing chamber, and an extraction assembly 8 having the function of conveying the beverage extracted from the pod 2 to an outlet duct 9 obtained in the extraction assembly 8 and fluidically communicating, by a (not illustrated) flexible duct, with a (not illustrated) beverage dispensing nozzle.

According to a preferred embodiment, as that illustrated in the enclosed figures, the extraction assembly 8 is fixedly assembled on the frame 5, while the injection assembly 7 is movable, upon thrust of a drive mechanism 10, along axis 6, between the retracted position, which corresponds to the open configuration of the brewing device 1, and an advanced position, which corresponds to the closed configuration of the brewing device 1.

The drive mechanism 10 is of the manual type and comprises a toggle-joint mechanism 11 arranged between the injection assembly 7 and a longitudinal end of the frame 5 and comprising a crank 12 hinged to the frame 5 to rotate about a pin 13 horizontal and transverse to the axis 6, and a connecting rod 14 having an end hinged to the crank 12 by means of a pin 15 parallel to the pin 13 and the other end hinged to the injection assembly 7. The drive mechanism 10 further comprises a transmission lever 16 hinged, at an end, to the pin 15 and, at the opposite end, to a drive handle 17 rotatably assembled on the frame 5. In use, the rotation of the handle 17 between a lifted position (FIG. 2) and a lowered position (FIG. 8) controls, by means of the transmission lever 16 and the toggle-joint mechanism 11, the translation of the injection assembly 7 between the retracted position and the advanced position.

Between the frame 5 and the crank 12 a spring 18 is arranged which serves as a bistable spring, in other words it makes sure that the handle 17 reaches and keeps the lifted and lowered positions.

For this purpose, an end of the spring 18 is fixed to the frame 5, while the other end is fixed to the crank 12 at a point which, when the handle 17 is in the lifted position (FIG. 2), is arranged above the pin 13 such that the force of the spring 18 applied to the crank 12 results in an "opening" torque, i.e. a torque that tends to make the handle 17 rotate towards the lifted position; and, when the handle 17 is in the lowered position (FIG. 8), it is arranged below the pin 13 such that the force of the spring 18 applied to the crank 12 results in a "closure" torque, i.e. a torque that tends to make the handle 17 rotate towards the lowered position.

According to a non-illustrated variant, the drive mechanism 10 is not manual but automatized and comprises, for example, a rotative actuator coupled to the toggle-joint mechanism 11 or a linear actuator directly coupled to the injection assembly 7.

According to what illustrated in FIG. 2, the extraction assembly 8 and the injection assembly 7 define respective brewing half-chambers 19 and 20, which are conformed to mutually define, when the brewing device 1 is in the closed position, a brewing chamber having a shape complimentary to that of the central body 3 and of the pod 2.

Figure 4:
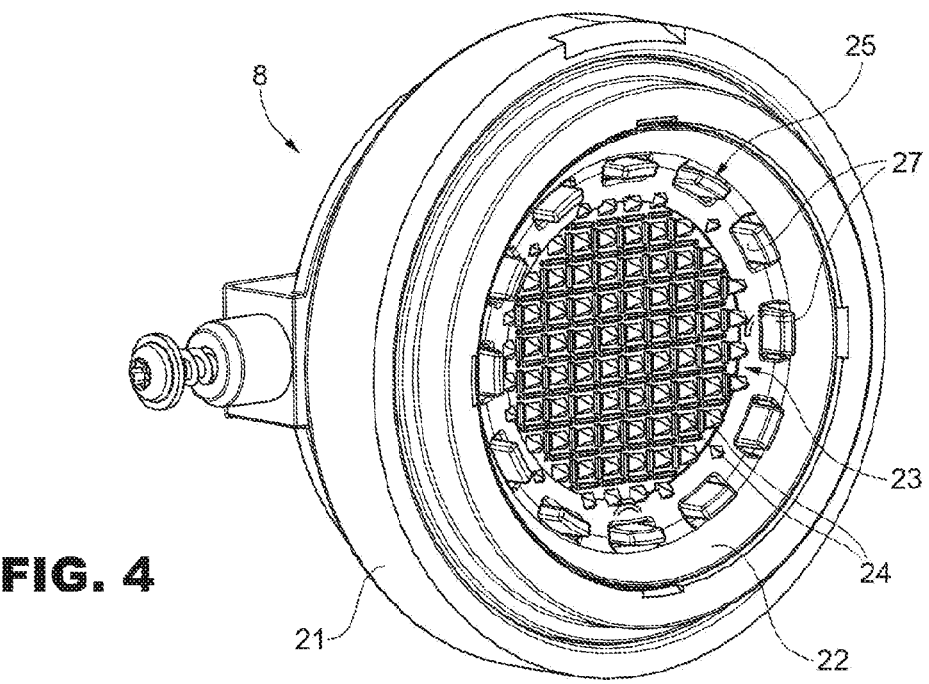
Figure 8:
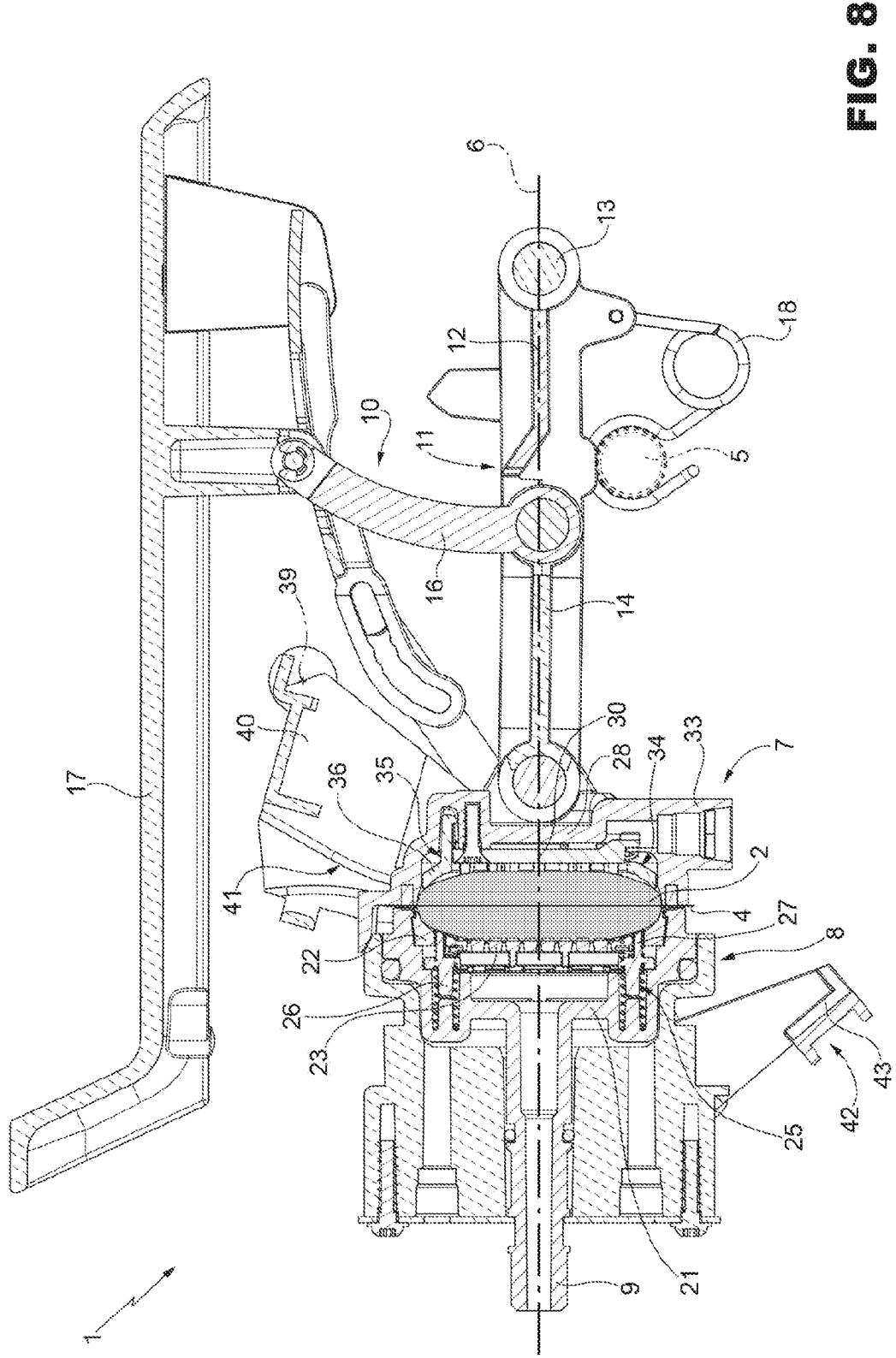
FIG. 8 is a longitudinal section of the brewing device of FIG. 1 arranged in a beverage extraction closed configuration.
Figure 9:
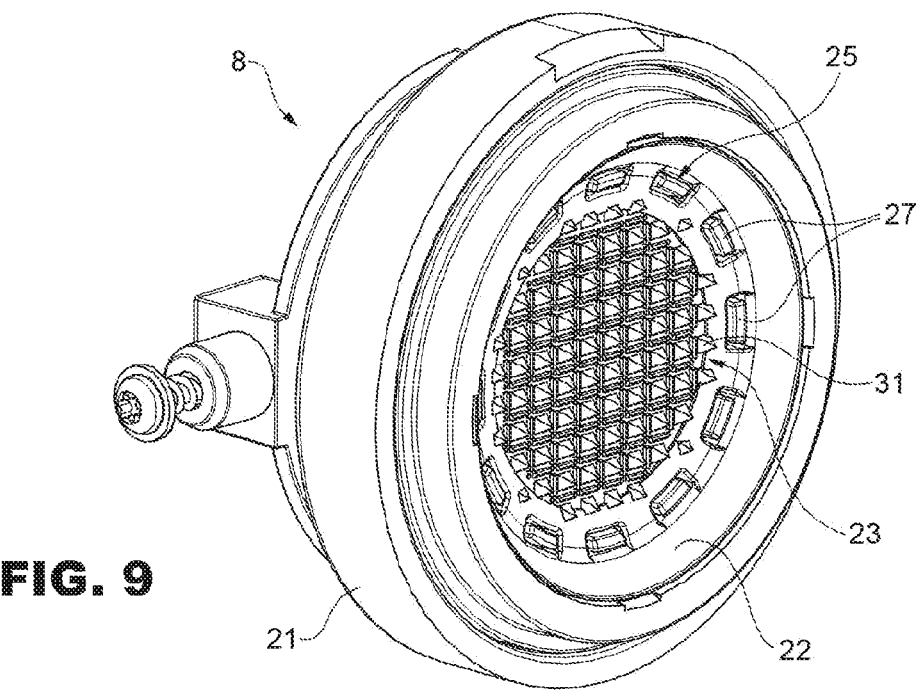
FIGS. 9 and 10 show a perspective view, in an enlarged scale, of corresponding details of the brewing device arranged in the configuration of FIG. 8.

In particular, according to what illustrated in FIGS. 2, 8 and, in greater detail, in FIGS. 4 and 9, the brewing half-chamber 19 of the extraction assembly 8 is obtained in a cup-shaped body 21 arranged with its concavity towards the injection assembly 7 and is defined by a cavity coaxial to the axis 6, directed towards the injection assembly 7 and having a shape that is substantially complimentary to the half of the central body 3 of the pod 2, in relation to the plane passing through the flange 4.

According to the preferred embodiment illustrated in the enclosed figures, the brewing half-chamber 19 is formed by a concave insert 22 arranged at the open end of the concavity of the cup-shaped body 21 and delimited by a bottom surface, preferably perpendicular to the axis 6 and by a curved annular side wall.

The extraction assembly 8 further comprises a piercing device 23 adapted to pierce the pod 2 when the latter is closed in the brewing chamber, to allow extracting the beverage. The piercing device 23 is supported by the concave insert 22 and comprises a plurality of piercing spikes 24 protruding from the bottom surface of the concave insert 22 to the injection assembly 7. Piercing spikes 24 are full tips and can be of any shape adapted to the object such as, for example, a pyramid shape, as in the case illustrated in the enclosed figures. The concave insert 22 further has a plurality of pass-through holes, distributed in the bottom surface between piercing spikes 24 and adapted to convey the beverage extracted from the pod 2 to a collecting chamber obtained in the cup-shaped body 21 and fluidically communicating with the outlet duct 9.

According to what illustrated in detail in FIGS. 4 and 9, the extraction assembly eventually comprises a segmented centering/extracting device 25 intended to ease the centering of the pod 2 in the brewing half-chamber 19 when the brewing device 1 is closed and the exhausted pod 2 is detached from the piercing device 23 when the brewing device 1 returns to the open position at the end of the beverage dispensing step.

The segmented centering/extracting device 25 is defined by a ring 26 (FIGS. 2, 6, 7 and 8), elastically assembled between the cup-shaped body 21 and the concave insert 22, and by a plurality of protruding elements 27 which are integral with the ring 26, are evenly distributed around the axis 6 and extend slidably, in a direction that is parallel to the axis 6, through corresponding eyelets obtained in the concave insert 22.

The protruding elements 27 are configured to assume a normal extracted or protruding position, wherein they extend inside the brewing half-chamber 19 forming a ring of protruding elements 27 all around the piercing device 23 (FIG. 4), and a forced retracted or re-entrant position, in which the protruding elements 27, following insertion of the pod 2 in the brewing half-chamber 19, are pushed backwards in corresponding eyelets towards the bottom of the cup-shaped body 21 so as to no longer project within the brewing half-chamber 19 (FIG. 9).

When the brewing device 1 is re-opened, and the pod 2 in no longer forced in the half-chamber 19 by the injection assembly 7, the protruding elements 27 elastically return to their normal extracted position thereby thrusting the pod 2 in an axial direction such to cause detachment and departing from the piercing device 23.

Figure 5:
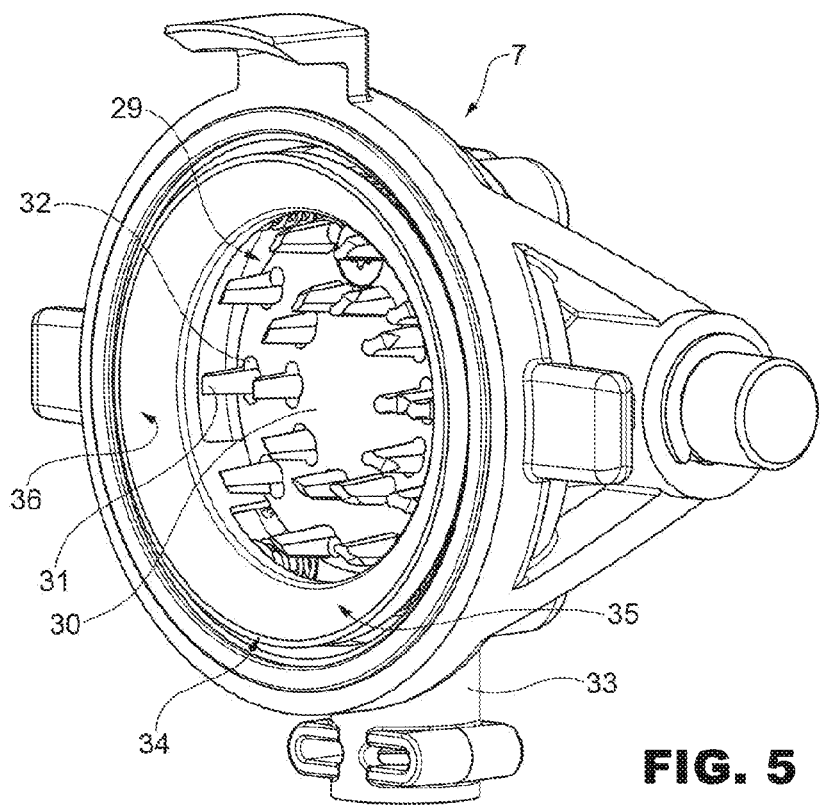
Figure 10:
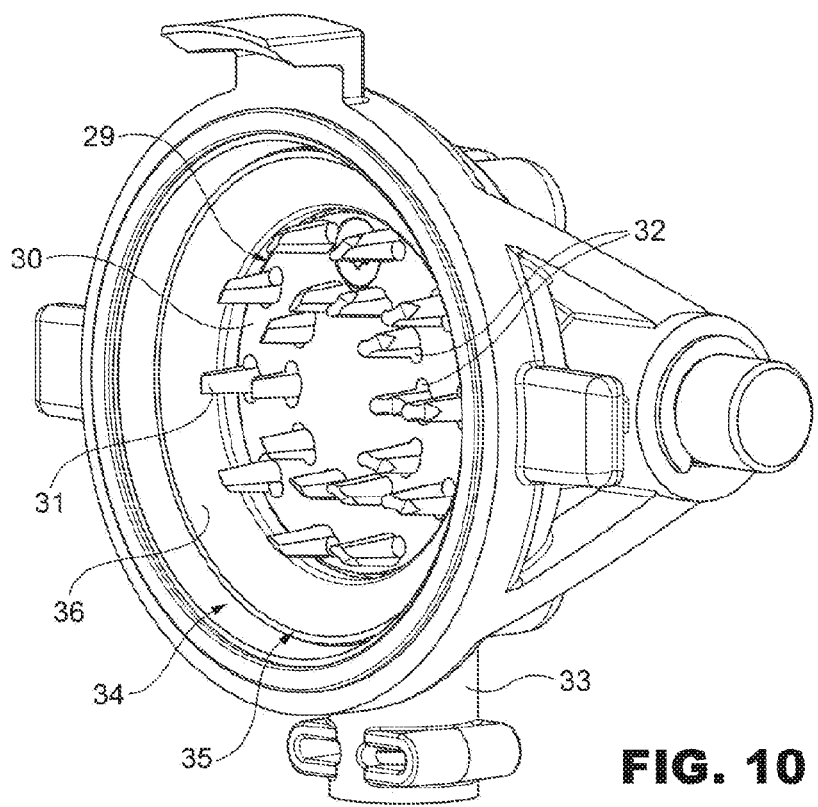

According to what illustrated in FIGS. 2, 8 and, in greater detail, in FIGS. 5 and 10, the injection assembly 7 also comprises a cup-shaped body 28 arranged with its concavity towards the extraction assembly 8 and the corresponding brewing half-chamber 20 is obtained in the cup-shaped body 28 and is defined by a cavity coaxial to the axis 6, directed towards the extraction assembly 8 and having a shape that is substantially complimentary to the half of the central body 3 of the pod 2, in relation to the plane passing through the flange 4.

The brewing half-chamber 20 is provided with a piercing device 29 adapted to pierce the pod 2 when the latter is closed in the brewing chamber to allow injecting hot pressured water. The piercing device 29 comprises a disc 30 integrally coupled with the bottom of the cup-shaped body 28 and provided with a plurality of piercing spikes 31, which will be described in detail hereinafter, protruding from the disc 30 towards the inside of the brewing half-chamber 20.

The disc 30 has a plurality of holes 32 adapted to let hot pressured water supplied to the injection assembly 7 through an inlet duct 33 enter into the brewing half-chamber 20.

According to the preferred embodiment illustrated in the enclosed figures and, in detail, in FIGS. 5 and 10, the injection assembly 7 eventually comprises an annular centering/extracting device 34 intended to ease the centering of the pod 2 in the brewing half-chamber 20 while the brewing device 1 is closed and the detachment of the exhausted pod 2 from the piercing device 29 when the brewing device 1 returns to the open position at the end of the beverage dispensing step.

The annular centering/extracting device 34 comprises an annular element 35, which is assembled, by interposing elastic means, between the piercing device 29 and the cup-shaped body 28 and has, towards the extraction assembly 8, a portion of concave bell-mouthed end 36 coaxial to the axis 6. The annular element 35 is movable parallel to the axis 6 between a normal extracted position, in which the portion of concave bell-mouthed end 36 is arranged beyond the piercing spikes 31 (FIG. 5), and a forced retracted position, in which the portion of concave bell-mouthed end 36 is pushed towards the bottom of the cup-shaped body 28 from the pod 2 which occupies the brewing half-chamber 20 and it is arranged around the piercing spikes 31 such to define part of the brewing half-chamber 20 thereof (FIG. 10).

When the brewing device 1 is re-opened, and the pod is no longer forced in the brewing half-chamber 20, the annular centering/extracting device 34 returns, upon thrusting by the mentioned elastic means, to the normal extracted position thrusting the pod 2 in the axial direction so as to cause detachment and departing of the pod 2 from the piercing device 29.

Figure 3:
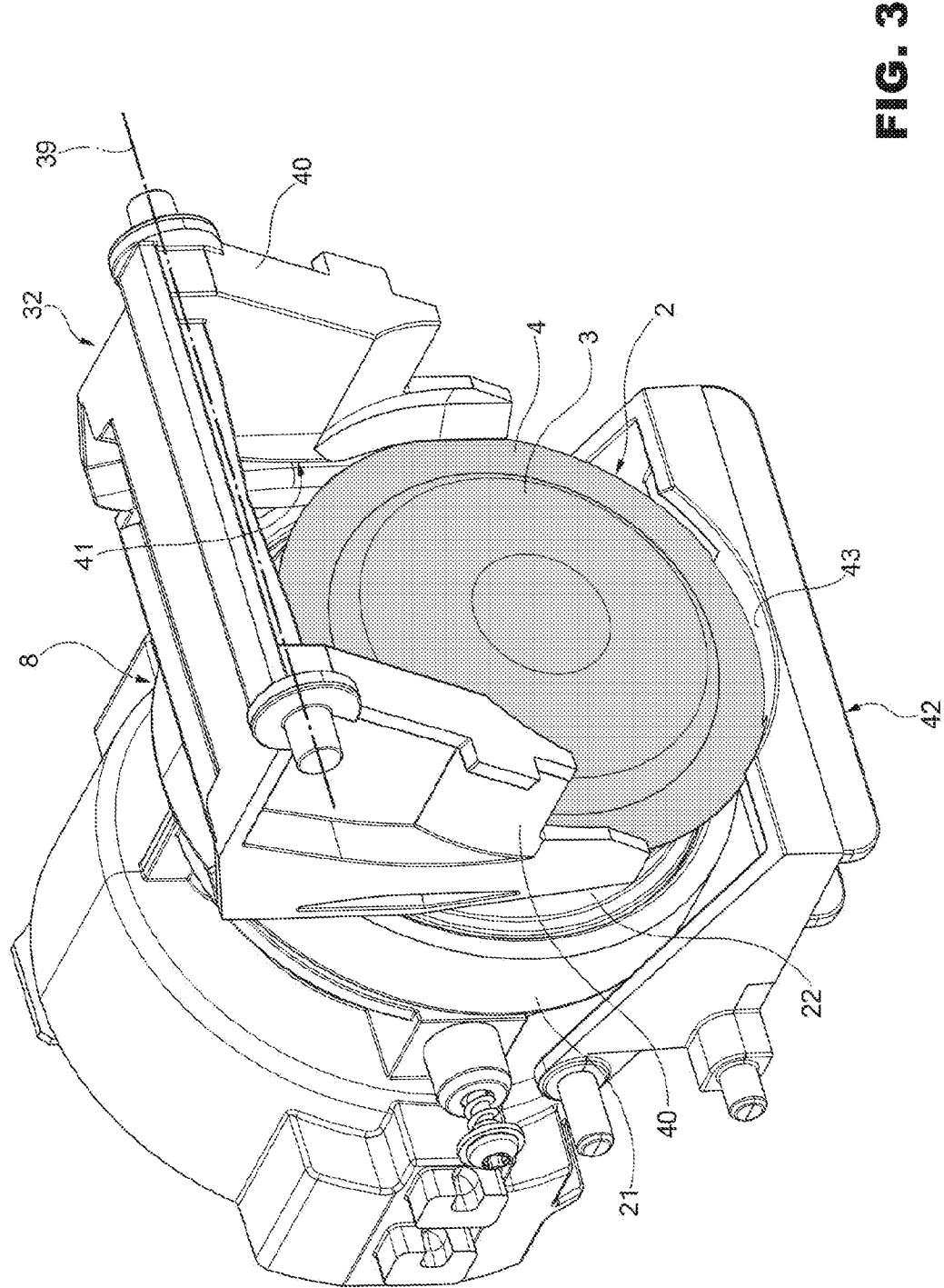
FIGS. 3, 4 and 5 show a perspective view, in an enlarged scale, of corresponding details of the brewing device arranged in the configuration of FIG. 2.

Referring to FIGS. 1, 2 and 3, the brewing device 1 further comprises a pod support device 37, which is arranged between the injection assembly 7 and the extraction assembly 8 and it is configured to receive and retain a new pod 2, which, in use, is supplied by gravity through an insertion opening 38 formed in the frame 5 or in an external cover supported by the frame 5.

The pod support device 37 is mounted on the frame 5 to rotate around an axis 39 that is horizontal and transverse to axis 6 between a pod retention position, wherein the pod support device 37 faces injection and extraction assemblies 7 and 8 and is able to retain a pod 2 in a loading position (FIG. 2), and a disengagement position, wherein the pod support device 27 is rotated upwards around the axis 39 and no longer contributes to support the pod 2, which is being delivered to injection and extraction assemblies 7 and 8 (FIG. 8).

In particular, the axis 39 is arranged above the injection assembly 7 and extraction assembly 8, and the pod support device 37 comprises two plates 40 arranged at opposite sides of the axis 6 and mutually connected by means of an upper crossbeam 41.

The plates 40 have, on corresponding inner surfaces directed one towards the other and towards the axis 6, corresponding grooves 41, which are specular with respect to a vertical longitudinal plane passing through the axis 6 and are configured to be engaged, in use, by the flange 4 of a pod 2 supplied from above through the insertion opening 38.

The grooves 41 have on the bottom a curved portion which defines a transverse shoulder that is configured to retain the pod 2 in the said loading position, but that can be easily trespassed by the flange 4 itself when the pod support device 37 is rotated upwards. In this step, in fact, as we will see later on, while the pod support device 37 moves towards the disengagement position and takes the pod 2 to the brewing half-chamber 19, the flange 4 disengages from the pod support device 37 due to the flexibility of the pod 2 which slightly deforms at its major diameter to let the pod support device 37 be free to slip upwards and allow the pod 2 to stay between the brewing half-chambers 19 and 20.

According to what illustrated in FIG. 2, the plates 40 are arranged between the axis 39 and the extraction assembly 8 and the grooves 41 are arranged at the half-chamber 19.

In use, as we will better see hereinafter, the pod support device 37 is moved from the pod retention position to the disengagement position by a rotation, around the axis 39, of the pod support device 37 towards the extraction assembly 8, so as to determine grooves 41 approach the brewing half-chambers 19.

The movement of the pod support device 37 from the pod retention position to the disengagement position may be made by means of a devoted actuator or, as in the example illustrated in the enclosed figures, by the injection assembly 7, which, advancing towards the extraction assembly 8 while closing the brewing device 1, intercepts the pod support device 37 and provides an axial thrust which determines the rotation of the pod support device 27 around the axis 39.

When the brewing device 1 is re-opened the pod support device 37 moves from the disengagement position to the pod retention position due to its weight, possibly assisted by return elastic means.

According to what illustrated in FIGS. 1, 2 and 3, in a preferred embodiment, the brewing device 1 further comprises an auxiliary pod support device 42, which is arranged below the pod support device 37 and is intended to cooperate with the latter to support the pod 2 from below when this is in the loading position. Even though the auxiliary pod support device 42 is optional given that the pod support device 37 is able by itself to support the pod 2 in the loading position, its function is particularly advantageous in the step of inserting the pod 2, especially in the case of pods with a relatively high mass, as it prevents, thanks to the kinetic energy generated in the free-falling motion, the pod 2 to overcome grooves 41 and slide outside the pod support device 37.

The auxiliary pod support device 42 comprises a bracket 43 which extends below the pod support device 37 transverse to the axis 6 so as to define a support for the flange 4 of a pod 2 engaged between the grooves 41. The bracket 43 is rotatably mounted on the frame 5 to move between an operative position (FIG. 2), wherein it is able to support a pod 2 from the bottom, and an inoperative position (FIGS. 6, 7 and 8), wherein it is rotated downwards and leaves free the space underlying the pod support device 37 and the brewing half-chamber 19 so as to fail interfering with the falling of the pod 2 when the brewing device is re-opened at the end of the extraction process.

The bracket 43 can be automatically driven by means of a devoted actuator or it can be manually driven, such as in the example illustrated in the enclosed figures, by a lever transmission mechanism configured to transmit the handle 17 movement to the bracket 43 such that the bracket 43 is in the operative position when the handle 17 is in the lifted position and moves towards the inoperative position as soon as the handle 17 is rotated towards the downward position.

Figure 11:
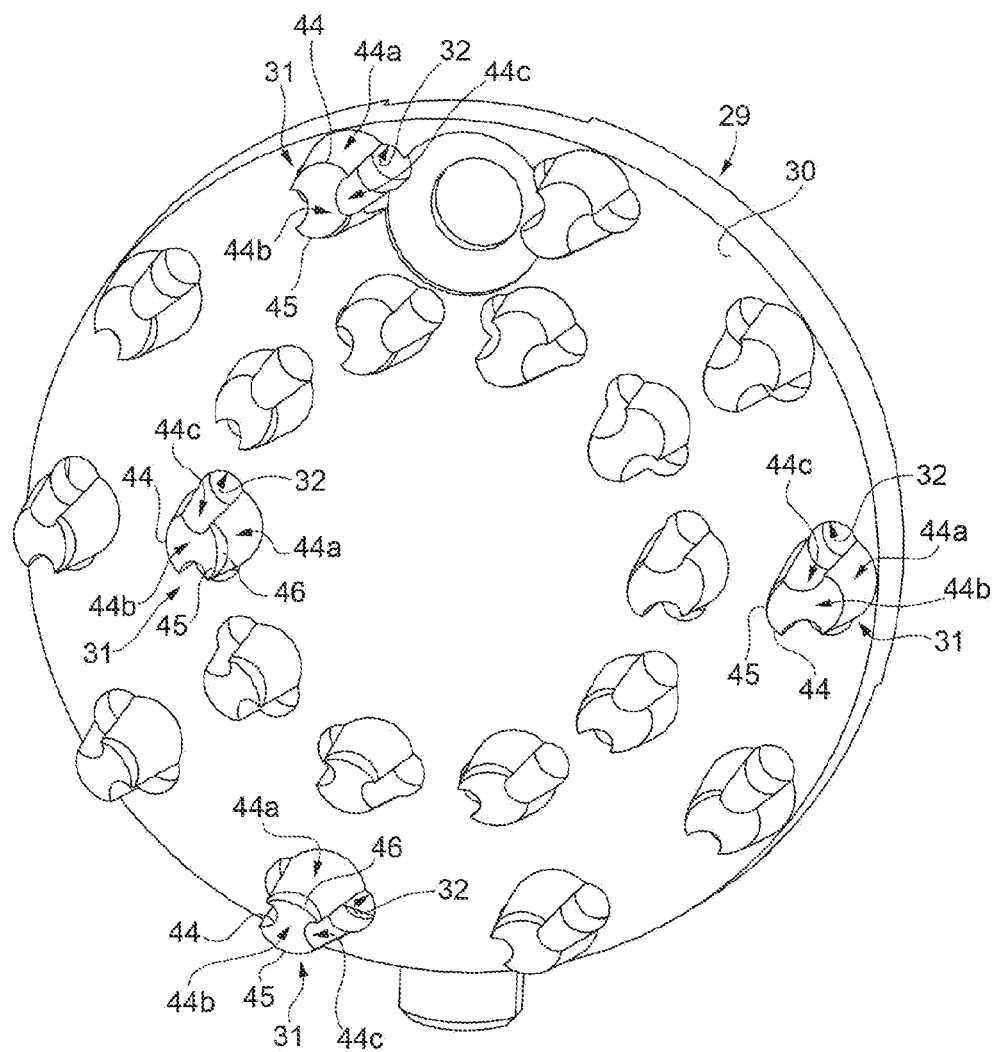
FIG. 11 shows the piercing device of FIGS. 5 and 10.
Figure 12:
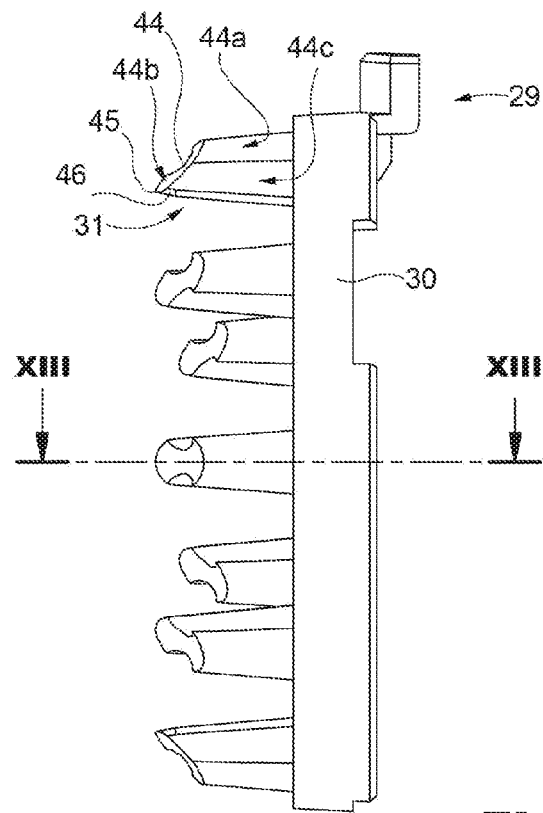
FIG. 12 is a side view of the piercing device of FIG. 11.
Figure 13:
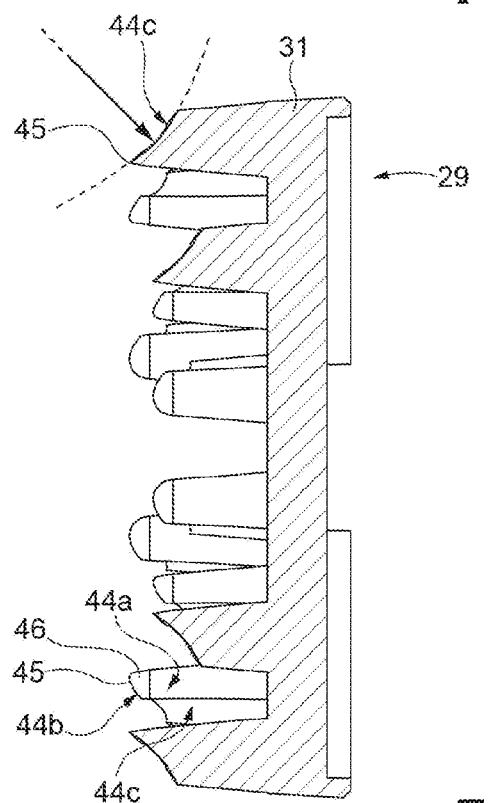
FIG. 13 is a section, along the line XIII-XIII, of FIG. 12.

FIGS. 11, 12 and 13 illustrate in detail the piercing device 29 of the injection assembly 7.

In addition to what previously set forth, it can be appreciated from FIGS. 11-13 that the piercing spikes 31 protruding from the disc 30 have the shape of blunt tips, limited at the sides by a side surface 44a and at the top by a top surface 44b, which defines, with the side surface 44a, a cutting edge 44.

According to what illustrated in FIG. 13, the top surface 44b of each piercing spike 31 is concave towards the outer piercing spike 31 itself.

Each piercing spike 31 is generally shaped as a solid obtained supposing to remove from the side surface of a section of a right cone two portions, that are specular with respect to a plane passing through the longitudinal axis of the cone section and delimited by corresponding concave surfaces 44c, which, preferably, extend throughout the height of the piercing spike 31.

Conveniently, the concave surfaces 44c of each piercing spike 31 are the intersection surfaces which would result from interpenetrating the cone section with two cylinders or virtual cones symmetrically arranged at opposite sides of the piercing spike 31.

Each piercing spike 31 is further associated with a pair of the aforesaid holes 32, which are symmetrically arranged at the sides of the piercing spikes 31 and each of them is partially delimited by one of the said concave surfaces 44c.

In other words, each pair of holes 32 associated with a piercing spike 31 can be considered as the holes resulting from interpenetrating the disc 30 into the aforesaid cylinders or virtual cones that interpenetrate into the truncated-cone piercing spike 31. Preferably, the concave surfaces 44c are conical surfaces, with a conicity reversed with respect to that of the truncated-cone surface and, consequently, holes 32 are tapered holes, with transverse section increasing towards the top of the piercing spike 31.

The shape of the top surface 44b, instead, can be considered as the result of the intersection between the piercing spike 31 with a spherical surface whose centre is arranged on the same side of piercing spikes 31 with respect to the disc 30 (FIG. 13).

Consequently, the cutting edge 44 has a generally bilobate shape, delimited by two convex portions separated by two symmetrical concave portions.

This configuration allows to obtain a significantly acute cutting edge 44, which is particularly advantageous in case the casing material of the pod 2 is relatively strong, for example an aluminium and/or a relatively thick aluminium and plastic sheet.

The top surface 44b is arranged asymmetrically with respect to the piercing spike 31, i.e. the spherical concavity defined by the top surface 44b is not centered with respect to the longitudinal axis of the piercing spike 31. It follows that the top surface 44b is oblique with respect to the piercing spike 31 axis and one of the convex portions of the cutting edge 44 defines a cutting tip 45.

The concave and asymmetric shape of the top surface 44b allows to obtain an aggressive cutting dynamics and a concentration of the compression strains of the coffee powder on the central axis of the piercing spike 31, partially offsetting the side deviations due to the shape of the pod 2.

Preferably, in order to improve the strength of the cutting edge 44 and move the cutting tip 45 towards the axis of the piercing spike 32, the top surface 44b is connected to the side surface 44a, at the cutting tip 45, by a convex radial joint 46.

The piercing spikes 31 have heights that differ from each other, increasing from the centre to the periphery of the disc 30, such to provide the piercing device 29 with a concave profile that is almost complimentary to the convex profile of the pod 2 so that holes made by the piercing spikes 31 in the pod 2 have a depth as much similar between them as possible. Furthermore, for a better penetration uniformity, the piercing spikes 31 are distributed on the disc 30 along two concentric circles and are oriented such that all the cutting tips 45 are directed towards the centre of the disc 30 (FIG. 11).

Figure 14:
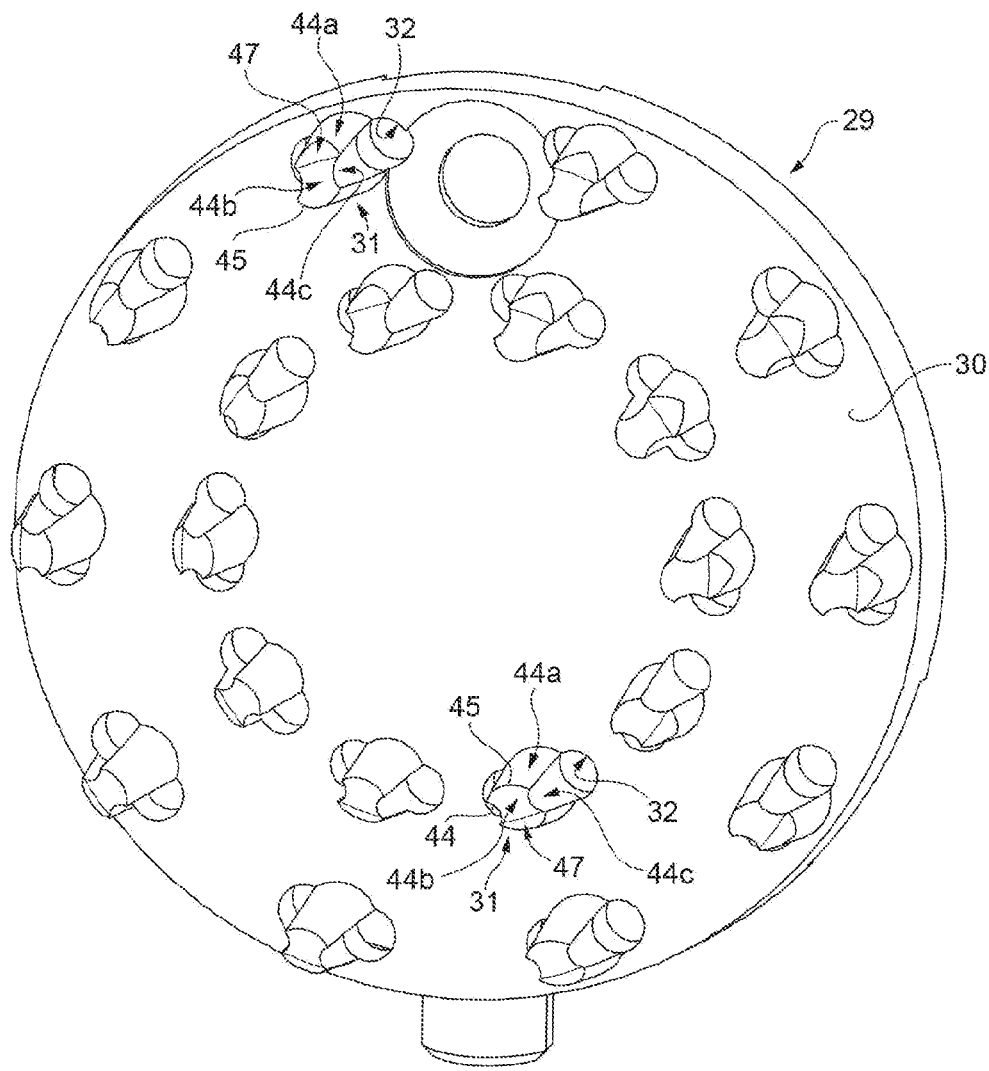
FIG. 14 shows a different embodiment of the piercing device of FIGS. 5 and 10.
Figure 15:
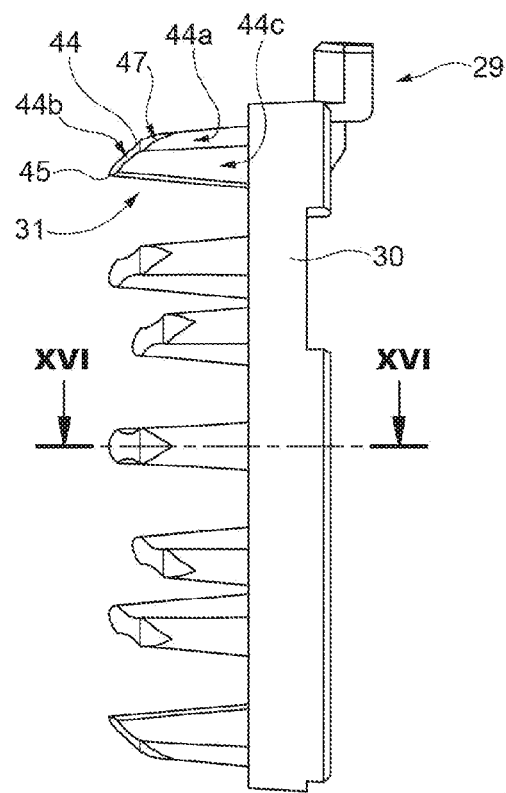
FIG. 15 is a side view of the piercing device of FIG. 14.
Figure 16:
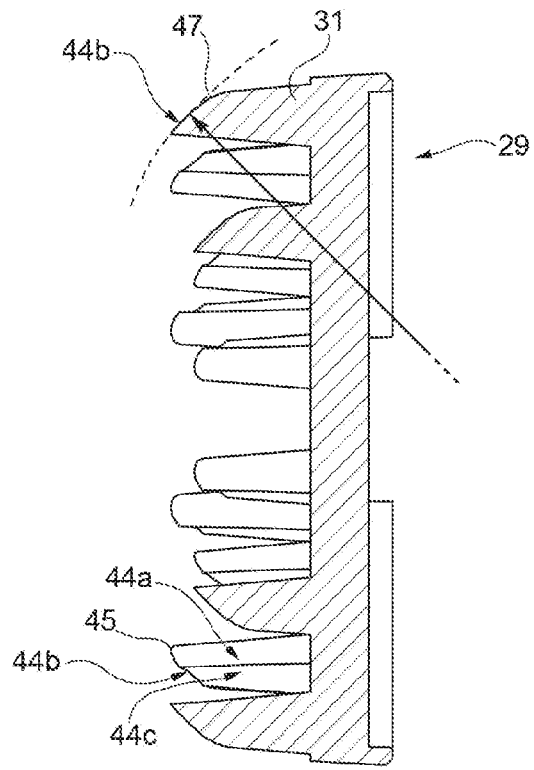
FIG. 16 is a section, along the line XVI-XVI, of FIG. 15.

FIGS. 14, 15 and 16 illustrate in detail an alternative embodiment of the piercing device 29 of the injection assembly 7 which differs from the piercing device 29 described with reference to FIGS. 11-13, as for the shape of the piercing spikes 31.

In this case also, the piercing spikes 31 have the shape of cones that are limited at the top by a curved top surface 44b. However, in this case, the top surface 44b of each piercing spike 31 is not concave but outwardly convex and can be considered as the result of the intersection between the piercing spike 31 with a spherical surface whose centre is arranged on the side opposite to the piercing spikes 31 with respect to the disc 30 (FIG. 16).

As in the previously described case, in this case also the top surface 44b is arranged asymmetrically with respect to the piercing spike 31, i.e. the spherical concavity defined by the top surface 44b is not centered with respect to the longitudinal axis of the piercing spike 31.

Preferably, at the convex portion of the cutting edge 44 opposite to the cutting tip 45, the top surface 44b is jointed to the side surface 44a by a convex radial joint 47 having a curve that is different with respect to the curve of the top surface 44b. In this case, therefore, the top surface 44b has a generally toroidal profile which joins tangent to the side surface 44a of the piercing spike 31. The double curve has the function to convey to the centre of the piercing spike 31 the result of compression forces thereby encouraging the post-compression of the coffee powder.

The evolving shape of the piercing spike 31, generated by the revolution of the inner profile, allows to obtain a piercing and opening dynamics with a non-linear progression.

This geometry allows downgrading deformation coefficients of the film while increasing depth of penetration of the piercing spikes 31 in the pod 2. This conformation is particularly advantageous in case the casing of the pod 2 is made of relatively low resistant material as it prevents the casing from tearing at the hole formed, but a flap always stays attached.

As in the previous case, in this one also, each piercing spike 31 is complemented with a pair of tapered holes 32 and the piercing spikes 31 have a height different between each other, that increases from the centre to the periphery of the disc 30, so as provide the piercing device 29 with a concave profile almost complimentary to the convex profile of the pod 2 so as to make holes in the pod 2 having a substantially uniform depth.

Eventually, in this case also, in order to obtain a better penetration uniformity, the piercing spikes 31 are distributed on the disc 30 along two concentric circles and are oriented such that all the cutting tips 45 are directed towards the centre of the disc 30 (FIG. 14).

To complete what set forth above, it must be noted that, according to a non-illustrated variant, the position of injection 7 and extraction 8 assemblies may be reversed such that the injection assembly 7 is fixed and the extraction assembly 8 is movable from and to the injection assembly 7. In this case, the pod support device 37 would release the pod 2 into the half-chamber 20 of the injection assembly 7.

The functioning of the brewing device 1 will be hereinafter described referring in particular to FIGS. 2, 6, 7 and 8 which describe the relevant steps of a beverage producing step starting from loading a pod to dispensing a beverage.

FIG. 2—Configuration of Loading the Pod

In this configuration the handle 17 is in the lifted position and leaves the insertion opening 38 free to allow introducing a new pod 2 into the pod support device 37, which is arranged in the pod support position.

The flange 4 of the pod 2 slidably engages the grooves 41 until the pod 2 stops in the loading position, where it faces the brewing half-chamber 19 of the extraction assembly 8 and is supported laterally by the pod support device 37 and at the bottom from the bracket 43.

Preferably, the pod support device 37 is configured to retain the pod 2 in a position that is non-centered with respect to the brewing half-chamber 8, i.e. in a position wherein the axis 2A of the pod 2 is arranged below the axis 6 of the brewing device 1. Preferably, the grooves 41 are configured to support the pod 2 such that the axis 2A of the latter is substantially horizontal and parallel to axis 6.

The position of the pod 2 that is non-centered and lowered with respect to the brewing half-chamber 19 has the function to offset the following lifting of the pod 2 generated by the pod support device 37 upward rotation in the following steps of closing the brewing device 1.

Conveniently, the deviation between the axis 2A of the pod 2 and the axis 6 is of about 2.5 mm.

According to a different non-illustrated embodiment, the pod 2 is retained in a position that is coaxial to the axis 6 and a contrast element is provided to avoid the following lifting thereof during the rotation in the pod support device 37.

Finally, in the loading configuration, either the segmented centering/extracting device 25, and the annular centering/extracting device 34 are in the corresponding extracted positions.

Figure 6:
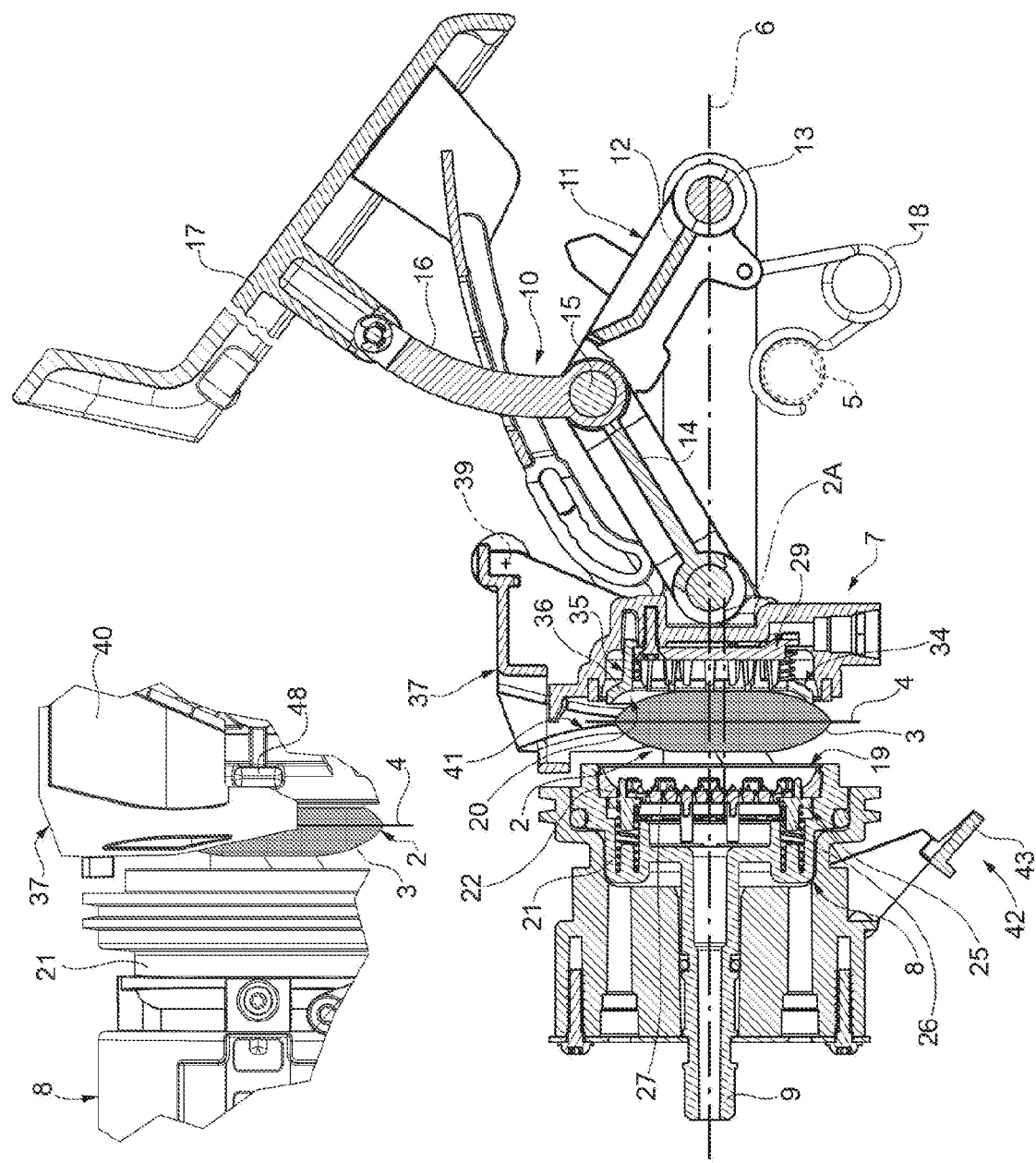
FIG. 6 is a longitudinal section of the brewing device of FIG. 1 arranged in a first closed intermediate configuration.

FIG. 6: Configuration of First Contact Between Pod Support Device and Injection Assembly When the handle 17 is moved towards its lowered position, the injection assembly 7 leaves its retracted position and translates along the axis 6 towards its advanced position.

At a certain point of this advancement, the injection assembly 7 contacts the pod support device 37 by means of two side attachments of the injection assembly 7 (FIG. 6, detail) which engage corresponding portions of the plates 40 of the pod support device 37. The injection assembly 7 approaches the support device 37 consequently resulting in the half-chamber 20 approaching the pod 2.

In this configuration of first contact between the pod support device 37 and the injection assembly 7, the pod support device 37 is still in the initial pod retention position, the auxiliary pod support device 42 has moved towards the inoperative position, and either the segmented centering/extracting device 25 and the annular centering/extracting device 34 are still in the corresponding extracted positions.

Figure 7:
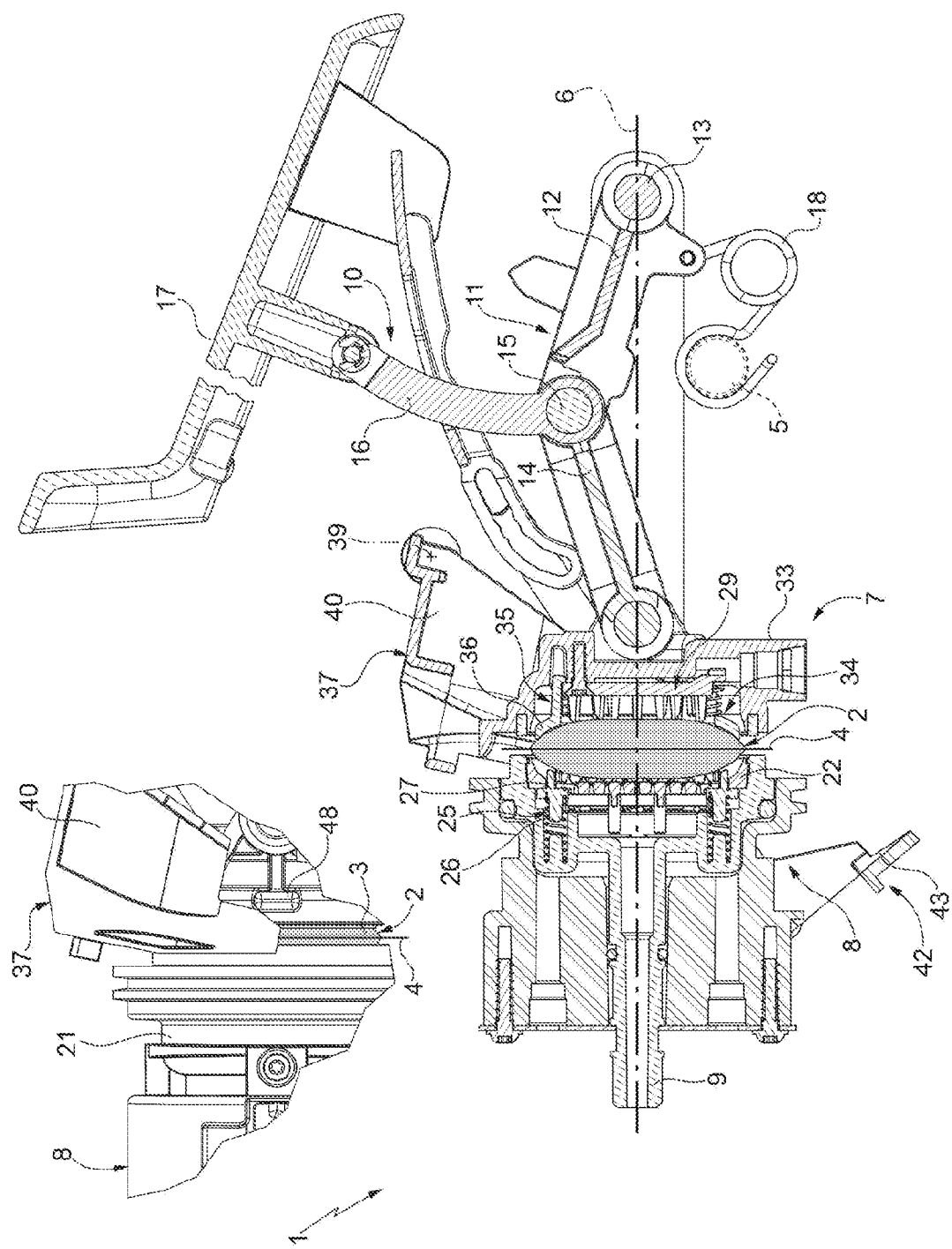
FIG. 7 is a longitudinal section of the brewing device of FIG. 1 arranged in a second closed intermediate configuration.

FIG. 7: Configuration of Detaching the Pod from the Pod Support Device

As a response to a further advancement of the injection assembly 7 and to the consequent thrust provided to the plates 40 by the two side attachments 48, the pod support device 37 rotates upwards around the axis 39 determining the lifting upwards of the pod 2 and, concurrently, the insertion of the pod 2 in the half-chamber 19, with flexion of the flange 4 and its progressive disengagement from the grooves 41.

After the pod support device 37 has performed a determined rotation angle, preferably of about 11°, the pod support device 37 stops supporting the pod 2 which is inserted in the half-chamber 19 with its own axis 2A substantially coincident with axis 6.

In this configuration, the pod 2 is substantially in the brewing position, i.e. in the position it will take when the injection assembly 7 terminates its stroke and couples with the brewing assembly 8 pressing the flange 4 between them such to obtain a fluid-tight coupling.

According to what illustrated in FIG. 7, in this configuration, the central body 3 of the pod 2 is supported on the piercing spikes 24 of the piercing device 23, which is still in the extracted position, and on the protruding elements 27 of the segmented centering/extracting device 25, also in the extracted position.

The pod 2, once left by the pod support device 37, is kept still in the brewing half-chamber 19 by the passive contrasting action exerted by the injection assembly 7, in particular by the annular centering/extracting device 34 37, arranged in its extracted position.

In other words, the insertion of the pod 2 inside the brewing half-chamber 19 is carried out by the pod support device 37, while the injection assembly 7, in particular the annular centering/extracting device 34, does not actively contribute to the insertion of the pod 2 into the brewing half-chamber 19, i.e. it does not substantially provide any axial thrust to the pod 2 while this is still retained by the pod support device 37, but it only exerts a passive contrasting action when the pod 2 is left by the pod support device 37 in the brewing half-chamber 19.

It follows that the movement of the pod 2 from the loading position to the brewing position occurs without submitting the pod 2 to axial stresses, in particular by the injection assembly 7. As a consequence the risk that the pod 2 undergoes significant deformations in the step of closing the brewing chamber, which may jeopardize the beverage extraction process and the discharge of the exhausted pod is removed, or at least minimized, FIG. 8: Configuration of Brewing and Dispensing A further movement of the handle 17 towards the lowered position determines a further rotation of the pod support device 37, preferably of another 4-5°, and the advancement of the injection assembly 7 with consequent insertion of the pod 2 into the brewing half-chamber 20, retraction of the annular element 35 of the centering/extracting device 34 and penetration of the piercing spikes 31 in the central body 3 of the pod 2.

When the handle 17 reaches the lowered position, the end surface of the injection assembly 7 and the end surface of the extraction assembly 8 clamp the flange 4 of the pod 2 therebetween and tightly close the brewing chamber formed by the brewing half-chambers 19 and 20 and containing the pod 2.

It must be specified that the brewing chamber closure determined by this last movement of the injection assembly 7 does not substantially modify the previous pod 2 position, in particular of the central body 3 of the pod 2, which remains supported on piercing spikes 24 and on protruding elements 27, while it is being pierced, on the opposite side, by piercing spikes 31.

The flange 4, axially thrust by the injection device, undergoes a slight flexion towards the extraction assembly 8 and is thus pressed between the two assemblies.

Now, hot pressured water is supplied to the brewing chamber through the inlet duct 33.

The pod 2 imbibition causes the swelling of the pod 2, which thrusts the protruding elements 27 towards their retracted position and is penetrated by the piercing spikes 24, letting the extracted beverage outflow from the pod 2 and thus flow outside the extraction assembly 8 via the outlet duct 9.

When dispensing is over and the handle 17 is returned in the lifted position, the injection assembly 7 departs from the extraction assembly 8 and the pod 2 falls downwards by gravity. The pod 2 effectively detaches from the piercing devices 23 and thanks to the segmented centering/extracting device 25 and annular centering/extracting device 34.

Either the annular element 35 of the annular centering/extracting device 34, and the protruding elements 27 of the segmented centering/extracting device 25 have the advantage to provide the pod 2 with an axial thrust along an annular portion of the pod 2.

In particular, as regards the conformation of the segmented centering/extracting device 25, the fact that it is a ring of discreet elements such as the protruding elements 27 to thrust the pod 2 leads to the following advantages:

unlike what a single extractor could do, protruding elements 27 allow to evenly distribute the thrust force and therefore do not risk to damage or even tear the pod 2 while extracting coffee, when the pod 2 is damp, especially in case of pods made of poorly resistant materials, such as biodegradable materials;

the presence of the ring of protruding elements 27 sliding through corresponding eyelets of the bottom of the brewing half-chamber 19 makes it possible to manufacture the rest of the brewing half-chamber 19 in a single piece, the concave insert 22, to the entire benefit of uniformity of the surface supporting the pod 2;

the presence of eyelets and the elastic assembling of the protruding elements 27 makes it possible to create in the brewing half-chamber 19 expansion areas for the pod 2 when it absorbs hot pressured water. It is thereby possible to conform the concave surface of the brewing half-chamber 19 in such a way as to reproduce the pod 2 convexity with relative precision and give protruding elements 27 the function to define, in respective eyelets, expansion areas for the pod 2 which undergoes a natural, though minimum, swelling when injected with water;

the position of the protruding elements 27, which are arranged so as to engage a peripheral edge of the central body 3 of the pod 2, avoids "obscuring" the central area of the pod 2 from which the beverage mostly outflows and therefore avoids a reduction of the outlet flow section, as it would happen, for example, in case a single central extractor was provided.

The invention claimed is:

1. A brewing device for producing a beverage from a single-serve pod; wherein the single-serve pod includes a casing formed of two sheets of plastic and/or aluminium and/or paper mutually coupled to form a central body containing a brewable material, and an external annular flange extending all around, and seals, the central body; the brewing device comprising:

two functional assemblies defining respective brewing half-chambers and mutually movable along a longitudinal axis between an open configuration, in which the two brewing half-chambers mutually define a space for loading a pod, and a closed configuration, in which the two brewing half-chambers mutually define a brewing chamber for the pod; one of said two functional assemblies is a water injection assembly and the other is a beverage extraction assembly; and a pod support device rotatably mounted about a fixed axis transverse to the longitudinal axis to move between a pod retention position, in which the pod support device is capable to receive a pod and support the pod by itself in a loading position between the two functional assemblies in said open configuration, and a disengagement position in which the pod support device is moved aside relative to the functional assemblies after having delivered the pod to the functional assemblies;

wherein a path of the pod support device from the pod retention position to the disengagement position during the rotation about the fixed axis is so designed as to cause the pod support device to insert and leave the pod in the brewing half-chamber of one of said functional assemblies.

2. The brewing device of claim 1, wherein one of the two functional assemblies is a stationary functional assembly and the other is a movable functional assembly operable to move to and from the stationary functional assembly along said longitudinal axis between a retracted position corresponding to the open configuration of the brewing device, and an advanced position corresponding to the closed configuration of the brewing device; the pod support device is so arranged as to insert and leave the pod in the brewing half-chamber of the stationary functional assembly.

3. The brewing device of claim 2, wherein the two functional assemblies are arranged so that, when the pod support device reaches the disengagement position, the movable functional assembly engages the pod in order to hold it inside the brewing half-chamber of the stationary functional assembly.

4. The brewing device of claim 2, wherein the movement of the pod support device from the pod retention position to the disengagement position is caused by a mechanical interference between the pod support device and the movable functional assembly in response to a movement of the mobile functional assembly towards the advanced position.

5. The brewing device of claim 4, wherein the movement of the pod support device from the disengagement position to the pod retention position takes place under the effect of gravity and/or under the thrust of elastic return means, in response to the return of the brewing device to the open configuration; the path of the pod support device from the disengagement position to the retention position is so designed to cause the pod support device to fail to interfere with the pod, whereby leaving the pod free to fall downwards under the effect of gravity, in response to the return of the brewing device to the open configuration.

6. The brewing device of claim 2, wherein the stationary functional assembly is the extraction assembly, whereas the movable functional assembly is the injection assembly.

7. The brewing device of claim 1, wherein the pod support device is configured to hold, in its pod retention position, the pod in a position moved downwards relative to the longitudinal axis; and the path of the pod support device from the pod retention position to the disengagement position is so designed to cause the pod support device to lift the pod to a position coaxial to the longitudinal axis before leaving the pod in the brewing half-chamber.

8. The brewing device of claim 1, wherein the pod support device comprises two facing grooves arranged on opposite sides of the longitudinal axis and configured to be slidably engaged by the flange of a pod fed from above by gravity and to hold the pod in the loading position.

9. The brewing device of claim 1, further comprising a supplemental pod support device including a transverse member arranged below the pod support device and rotatably mounted about an axis transverse to the longitudinal axis to rotate between an operative position, in which the transverse member defines a support for a flange of a pod in the pod support device, and a inoperative position, in which the transverse member is so moved aside as to leave a free space below the pod support device, whereby failing to interfere with the falling of the pod when the brewing device returns to the open configuration.

10. The brewing device of claim 1, wherein the brewing half-chambers are bounded by facing cavities coaxial to the longitudinal axis and each having a shape approximately complementary to half of the central body of a pod with respect to a plane passing through the flange.

11. The brewing device of claim 1, wherein, when the pod support device leaves the pod in the brewing half-chamber of one of the functional assemblies, the pod is in a brewing position, which is the position that the pod assumes in the brewing chamber when the functional assemblies are arranged in the closed position.

\* \* \* \* \*